Patented Feb. 11, 1930

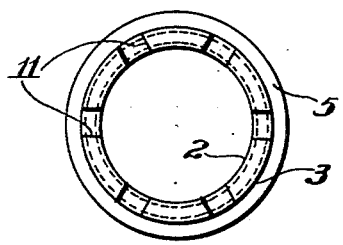
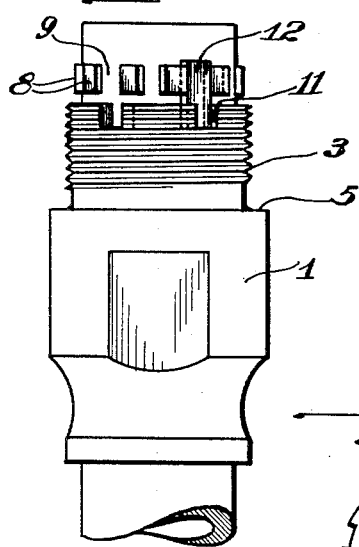
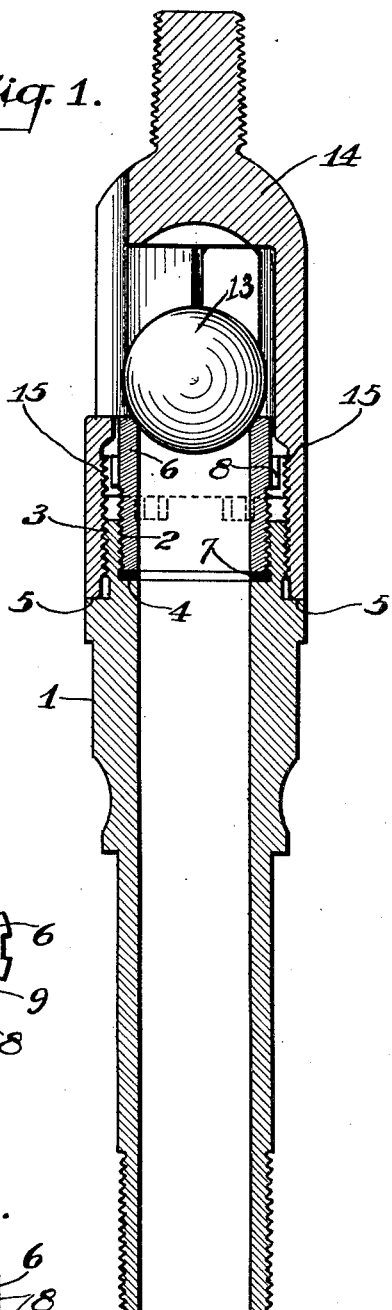
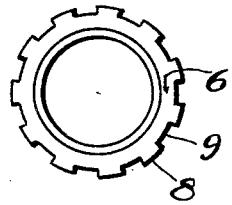
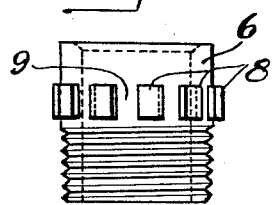

1,746,957

UNITED STATES PATENT OFFICE

GEORGE B. MORRIS AND FAY L. INGLERIGHT, OF BRADFORD, PENNSYLVANIA, ASSIGNORS TO BRADFORD MOTOR WORKS, OF BRADFORD, PENNSYLVANIA, A CORPORATION OF PENNSYLVANIA

VALVE FOR WORKING BARRELS

Application filed June 23, 1928. Serial No. 287,690.

The invention relates to pump valves of the type utilized in apparatus for pumping oil or water wells.

Heretofore in the use of pump valves of the ball or check valve type which are commonly employed in connection with pumping apparatus for the above purpose, considerable difficulty has been encountered by reason of leakage around the valve seat between the ball or check valve and the valve seat. One reason that such leakage occurs is due to the way the valve seat member is usually attached in this retaining member. To prevent leakage around the periphery of the valve seat, it is either tightly secured or forcibly pressed into position and then held in place by shouldering a portion of the cage against the seat. Where valves have been thus constructed no matter how accurately or precisely the valve seats have been ground, the forcible pressing and wrenching involved in their assembly usually so distorts the members that the valves do not fully contact with their seats, and leakage occurs around and between them, which is detrimental to long life of the valve and efficient pumping.

The object of this invention generally stated is to provide a pump valve of the ball or check valve type in which provision is made for accurately and precisely positioning the valve seat member in its retaining member in such a way that there is no distortion of the seat member, and leakage around it and between it and the valve is prevented.

A more special object of the invention is to provide a pump valve of the above described character in which the valve seat member is substantially loosely threaded into the valve seat retaining member and contacted therewith through a gasket which makes a tight joint between it and the valve seat retaining member without distorting the valve seat sufficiently to cause leakage between it and the valve, and in which the valve seat member is locked to prevent it from turning in the barrel when placed in service.

The invention is illustrated in the accompanying drawings in which Fig. 1 is a sectional view taken longitudinally through a pump valve embodying the preferred form of the invention; Fig. 2, a side elevation of the valve with the upper cage member removed; Fig. 3, a top plan view of the barrel or seat retaining member; Figs. 4 and 5 side elevation and top plan views, respectively, of a valve seat member; and Fig. 6 a view of a key employed for locking the valve seat member in fixed relation with its retaining member.

According to the invention, the barrel or seat retaining member of the valve is provided with an interior and an exterior thread, and with an interior and an exterior annular shoulder or flange adjacent to these threads. A valve seat member having an exterior thread is loosely threaded into the seat retaining member, its lower end abutting against a soft metal or fiber gasket disposed upon the inner annular flange whereby a loosely threaded but nevertheless tight joint is made between the valve seat member and its retaining member. To prevent the valve seat member from turning due to vibration of the valve when in operation, means may be provided for locking it in a fixed position. The upper portion of the valve seat is accurately and precisely ground in the usual way for receiving a ball valve, or other type of check valve. The usual type of cage member is screwed on the seat retaining member with its end abutting against the annular flange disposed on the seat retaining member adjacent its outer thread, but at no place making contact with the valve seat.

Referring now to the drawing, the valve mechanism is illustrated as comprising a barrel or seat retaining member 1 having an inner threaded portion 2 and an outer threaded portion 3 in this instance on its upper end, and having an inner annular flange 4 and an outer annular flange 5 at the lower ends of these threads, respectively. In the end of the seat retaining member there is a valve seat member 6 having an exterior thread loosely engaging the inner thread of the barrel whereby the seat member is not distorted by the connection. A tight joint is made between the valve seat member and the seat retaining member by means of a gasket 7 which is disposed upon the inner annular flange 4 of the barrel. The lower end of valve seat member 6 is abutted against the gasket sufficiently tight to prevent leakage between it and the seat retaining member, but not sufficiently tight to deleteriously distort the valve seat member. A gasket for this purpose preferably comprises a ring of soft metal, fiber or other yielding material.

In order that the valve seat member may be locked against turning with relation to its retaining member after it has been properly positioned, a number of spaced grooves 9 may be provided in an annular shoulder 8 disposed on the upper outer portion of the valve seat member, and a number of spaced notches 11 cut in the upper end of seat retaining member 1. The number and positions of notches 11 and grooves 9 are such that at practically all positions of the valve seat member one of the notches will register with one of the grooves so that a key 12 may be placed in them to lock the valve seat member in place. The upper inner end of valve seat member 6 is accurately and precisely ground to receive a ball check valve 13 or other similar type of valve.

A cage 14, which may be of the usual form having an interior thread 15 on its lower end, is threaded on the exterior thread at the end of the seat retaining member, the lower face of the cage abutting against outer annular flange 5 and not only forming a smooth and tight joint with the seat retaining member but preventing the cage member from becoming unscrewed.

It is to be especially noted that the valve seat member is so loosely threaded into the barrel that it is in no way distorted, and therefore no leakage occurs between it and the valve by reason of incomplete contact of the valve with the seat. Also it will be noted that the seat member, while loosely fitted into the barrel, may be prevented from unscrewing when it is placed in service.

According to the provisions of the patent statutes, we have explained the principle and operation of our invention, and have illustrated and described what we now consider to be its best embodiment. However, we desire to have it understood that, within the scope of the appended claims, the invention may be practiced otherwise than as specifically illustrated and described.

We claim:

1. A pump valve comprising a seat retaining member exteriorly and interiorly threaded and having an interior annular flange at the lower end of said inner thread, a tubular valve seat member loosely threaded in the inner threaded portion of said retaining member, a gasket resting upon said annular flange and against which the lower end of said valve seat member contacts to form a tight joint, an accurately ground valve seat on the upper end of said valve seat member, a check valve seated in said valve seat, and a cage member having an interior thread engaging the exterior thread on said seat retaining member.

2. A pump valve comprising a seat retaining member exteriorly and interiorly threaded and having an interior and exterior annular flange at the lower end of said inner and outer thread respectively, a tubular valve seat member loosely threaded in the inner thread of said seat retaining member, a gasket resting upon said inner flange against which the lower end of said valve seat member abuts to form a tight joint, an accurately ground valve seat on the upper end of said valve seat member, a check valve disposed on said seat, and a cage member having an interior thread on its lower end engaging the exterior thread on said seat retaining member, the lower end of said cage abutting against said outer annular flange of the seat retaining member.

3. A pump valve comprising a seat retaining member exteriorly and interiorly threaded and having an interior annular flange at the lower end of said inner thread, a tubular valve seat member loosely threaded in the inner thread in said barrel, a gasket resting upon said annular flange against which the lower end of said valve seat member abuts to form a tight joint, means for preventing said valve seat member from turning after it is placed in position, an accurately ground valve seat on the upper end of said valve seat member, a check valve disposed on said seat, and a cage member provided on its lower end with an interior thread engaging the exterior thread on said barrel.

4. A pump valve comprising a seat retaining member exteriorly and interiorly threaded and having an interior annular flange at the lower end of said inner thread, a tubular valve seat member loosely threaded in said inner thread, a gasket resting upon said annular flange against which the lower end of said valve seat member abuts to form a tight joint, an annular shoulder on said valve seat member provided with a plurality of vertical grooves spaced around said shoulder, a plurality of notches disposed in spaced relation around the end of said seat retaining member, a key adapted to be fitted in one of said notches and one of said grooves when the valve seat member is positioned and thereby prevent said seat member from turning, an accurately ground valve seat on the upper end of said valve seat member, a check valve disposed in said seat, and a cage member provided with an interior thread engaging the exterior thread on said seat retaining member.

5. A pump valve comprising a seat retaining member exteriorly and interiorly threaded on its upper end and having an interior and an exterior flange at the lower end of said inner and outer threads respectively, a tubular valve seat member loosely threaded in said interior thread in the upper end of said seat retaining member, a gasket disposed on said inner annular flange against which the lower end of said valve seat member abuts to form a tight joint, a plurality of vertical grooves disposed around the periphery of the upper portion of said valve seat member, a plurality of notches disposed around the upper end of said seat retaining member, a key adapted to fit in one of said notches and one of said grooves registering therewith when the valve seat member is positioned and thereby prevent said member from turning, an accurately ground valve seat in the upper end of said valve seat member, a ball or other type of check valve disposed in said seat, and a cage member having an interior thread on its lower end engaging the exterior thread at the upper end of the seat retaining member, the lower end of said cage member abutting against said exterior annular flange.

In testimony whereof, we hereunto sign our names.

GEORGE B. MORRIS.
FAY L. INGLERIGHT.